(12) United States Patent
Shekhar et al.

(10) Patent No.: US 9,391,796 B1
(45) Date of Patent: Jul. 12, 2016

(54) METHODS AND APPARATUS FOR USING BORDER GATEWAY PROTOCOL (BGP) FOR CONVERGED FIBRE CHANNEL (FC) CONTROL PLANE

(75) Inventors: Ravi Shekhar, Sunnyvale, CA (US); Quaizar Vohra, Cupertino, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 83 days.

(21) Appl. No.: 13/334,277

(22) Filed: Dec. 22, 2011

Related U.S. Application Data

(60) Provisional application No. 61/426,125, filed on Dec. 22, 2010.

(51) Int. Cl.
| | |
|---|---|
| *H04L 12/28* | (2006.01) |
| *H04L 12/50* | (2006.01) |
| *H04L 12/56* | (2006.01) |
| *H04L 12/40* | (2006.01) |
| *H04J 3/12* | (2006.01) |
| *H04M 7/12* | (2006.01) |

(52) U.S. Cl.
CPC .......... H04L 12/40013 (2013.01); *H04J 3/12* (2013.01); *H04L 12/40019* (2013.01); *H04M 7/1265* (2013.01); *H04Q 2213/13176* (2013.01)

(58) Field of Classification Search
CPC ............ H04L 12/40013; H04L 12/40019; H04L 12/66; H04J 3/12
USPC .......................................................... 370/401
See application file for complete search history.

(56) References Cited

U.S. PATENT DOCUMENTS

| | | |
|---|---|---|
| 5,138,615 A | 8/1992 | Lamport et al. |
| 5,801,641 A | 9/1998 | Yang et al. |
| 5,825,772 A | 10/1998 | Dobbins et al. |
| 5,913,921 A | 6/1999 | Tosey et al. |
| 5,926,473 A | 7/1999 | Gridley |
| 5,987,028 A | 11/1999 | Yang et al. |
| 6,075,773 A | 6/2000 | Clark et al. |

(Continued)

FOREIGN PATENT DOCUMENTS

| | | |
|---|---|---|
| EP | 1318628 A1 | 6/2003 |
| EP | 1758320 A1 | 2/2007 |

(Continued)

OTHER PUBLICATIONS

U.S. Appl. No. 12/345,498, filed Dec. 29, 2008, entitled "Control Plane Architecture for Switch Fabrics".

(Continued)

*Primary Examiner* — Faruk Hamza
*Assistant Examiner* — Abu-Sayeed Haque
(74) *Attorney, Agent, or Firm* — Cooley LLP

(57) ABSTRACT

In some embodiments, an apparatus includes a first Fiber Channel (FC) switch configured to be operatively coupled to an FC network device and a second FC switch. The first FC switch is configured to receive, from the FC network device, a first control packet. The first FC switch is further configured to send to the second FC switch, based on the first control packet, a second control packet defined based on a decentralized control plane protocol. The second control packet includes information associated with an FC route that is associated with the FC network device such that the second FC switch can route FC data packets to the FC network device using an FC data plane protocol.

20 Claims, 5 Drawing Sheets

(56) References Cited

U.S. PATENT DOCUMENTS

| | | | |
|---|---|---|---|
| 6,088,802 A | 7/2000 | Bialick et al. | |
| 6,212,183 B1 | 4/2001 | Wilford | |
| 6,246,692 B1 | 6/2001 | Dai et al. | |
| 6,385,198 B1 | 5/2002 | Ofek et al. | |
| 6,393,026 B1 | 5/2002 | Irwin | |
| 6,532,088 B1* | 3/2003 | Dantu | H04J 14/0227 370/223 |
| 6,553,028 B1 | 4/2003 | Tang et al. | |
| 6,609,153 B1 | 8/2003 | Salkewicz | |
| 6,639,910 B1 | 10/2003 | Provencher et al. | |
| 6,654,373 B1 | 11/2003 | Maher, III et al. | |
| 6,658,481 B1 | 12/2003 | Basso et al. | |
| 6,816,486 B1 | 11/2004 | Rogers | |
| 6,823,454 B1 | 11/2004 | Hind et al. | |
| 6,856,620 B1 | 2/2005 | Dunsmore et al. | |
| 6,865,673 B1 | 3/2005 | Nesset et al. | |
| 6,868,082 B1 | 3/2005 | Allen, Jr. et al. | |
| 6,934,260 B1 | 8/2005 | Kanuri | |
| 7,024,592 B1 | 4/2006 | Voas et al. | |
| 7,027,731 B1 | 4/2006 | Wang et al. | |
| 7,173,931 B2 | 2/2007 | Chao et al. | |
| 7,230,947 B1 | 6/2007 | Huber et al. | |
| 7,233,568 B2 | 6/2007 | Goodman et al. | |
| 7,245,629 B1 | 7/2007 | Yip et al. | |
| 7,248,760 B1 | 7/2007 | Corbalis et al. | |
| 7,266,296 B2* | 9/2007 | Ovadia | H04Q 11/0066 398/45 |
| 7,277,429 B2 | 10/2007 | Norman et al. | |
| 7,289,513 B1 | 10/2007 | Medved et al. | |
| 7,315,897 B1 | 1/2008 | Hardee et al. | |
| 7,330,467 B2 | 2/2008 | Sharma | |
| 7,369,561 B2 | 5/2008 | Wybenga et al. | |
| 7,406,038 B1 | 7/2008 | Oelke et al. | |
| 7,408,927 B2 | 8/2008 | George | |
| 7,415,034 B2 | 8/2008 | Muller et al. | |
| 7,415,627 B1 | 8/2008 | Radhakrishnan et al. | |
| 7,428,219 B2 | 9/2008 | Khosravi | |
| 7,437,469 B2 | 10/2008 | Ellanti et al. | |
| 7,466,703 B1 | 12/2008 | Arunachalam et al. | |
| 7,471,676 B2 | 12/2008 | Wybenga et al. | |
| 7,548,560 B1* | 6/2009 | Dropps | H04L 49/357 370/401 |
| 7,596,614 B2 | 9/2009 | Saunderson et al. | |
| 7,675,912 B1 | 3/2010 | Ward et al. | |
| 7,715,382 B2 | 5/2010 | Lakshman et al. | |
| 7,746,799 B2 | 6/2010 | Kokot et al. | |
| 7,792,993 B1 | 9/2010 | Hopprich et al. | |
| 7,860,097 B1 | 12/2010 | Lovett et al. | |
| 7,877,483 B1 | 1/2011 | Finn | |
| 8,089,904 B2 | 1/2012 | Balasubramaniam et al. | |
| 8,175,079 B2 | 5/2012 | Alapuranen et al. | |
| 8,331,369 B2* | 12/2012 | Ee | H04L 12/2697 370/351 |
| 2002/0009078 A1 | 1/2002 | Wilson et al. | |
| 2002/0051450 A1 | 5/2002 | Ganesh et al. | |
| 2003/0039212 A1 | 2/2003 | Lloyd et al. | |
| 2004/0023558 A1 | 2/2004 | Fowler et al. | |
| 2004/0034702 A1 | 2/2004 | He | |
| 2004/0039820 A1 | 2/2004 | Colby et al. | |
| 2004/0054866 A1 | 3/2004 | Blumenau et al. | |
| 2004/0064559 A1 | 4/2004 | Kupst et al. | |
| 2004/0076151 A1 | 4/2004 | Fant et al. | |
| 2004/0254909 A1 | 12/2004 | Testa | |
| 2005/0063324 A1 | 3/2005 | O'Neill et al. | |
| 2005/0068968 A1* | 3/2005 | Ovadia | H04L 45/04 370/396 |
| 2005/0129017 A1 | 6/2005 | Guingo et al. | |
| 2005/0138346 A1 | 6/2005 | Cauthron | |
| 2005/0180438 A1 | 8/2005 | Ko et al. | |
| 2005/0193114 A1 | 9/2005 | Colby et al. | |
| 2005/0232258 A1 | 10/2005 | Wybenga et al. | |
| 2005/0267959 A1 | 12/2005 | Monga et al. | |
| 2006/0005185 A1 | 1/2006 | Nguyen | |
| 2006/0092975 A1 | 5/2006 | Ansari et al. | |
| 2006/0164199 A1 | 7/2006 | Gilde et al. | |
| 2006/0165085 A1 | 7/2006 | Konda | |
| 2006/0198321 A1 | 9/2006 | Nadeau et al. | |
| 2007/0036178 A1 | 2/2007 | Hares et al. | |
| 2007/0073882 A1 | 3/2007 | Brown et al. | |
| 2007/0091795 A1* | 4/2007 | Bonaventure | H04L 45/04 370/228 |
| 2007/0115918 A1 | 5/2007 | Bodin et al. | |
| 2007/0133406 A1* | 6/2007 | Vasseur | H04L 45/02 370/230 |
| 2007/0136489 A1 | 6/2007 | Temoshenko et al. | |
| 2007/0153462 A1 | 7/2007 | Crippen et al. | |
| 2007/0214275 A1* | 9/2007 | Mirtorabi | H04L 45/02 709/230 |
| 2007/0283045 A1 | 12/2007 | Nguyen et al. | |
| 2008/0031151 A1 | 2/2008 | Williams | |
| 2008/0086768 A1 | 4/2008 | Mirza-Baig | |
| 2008/0089323 A1 | 4/2008 | Elias et al. | |
| 2008/0112133 A1 | 5/2008 | Torudbakken et al. | |
| 2008/0126788 A1 | 5/2008 | Kreek et al. | |
| 2008/0130517 A1 | 6/2008 | Lee et al. | |
| 2008/0151863 A1 | 6/2008 | Lawrence et al. | |
| 2008/0165704 A1 | 7/2008 | Marchetti et al. | |
| 2008/0186875 A1 | 8/2008 | Kitani | |
| 2008/0192648 A1 | 8/2008 | Galles | |
| 2008/0214059 A1 | 9/2008 | Rothermel et al. | |
| 2008/0219184 A1 | 9/2008 | Fowler et al. | |
| 2008/0320117 A1 | 12/2008 | Johnsen et al. | |
| 2009/0049191 A1 | 2/2009 | Tolliver | |
| 2009/0109963 A1 | 4/2009 | Tanizawa et al. | |
| 2009/0141657 A1* | 6/2009 | Dutt | H04L 45/00 370/254 |
| 2009/0213779 A1 | 8/2009 | Zhang et al. | |
| 2009/0219830 A1 | 9/2009 | Venner et al. | |
| 2009/0271851 A1 | 10/2009 | Hoppe et al. | |
| 2009/0304010 A1 | 12/2009 | Kurebayashi et al. | |
| 2009/0328024 A1 | 12/2009 | Li et al. | |
| 2010/0002382 A1 | 1/2010 | Aybay et al. | |
| 2010/0002714 A1 | 1/2010 | George et al. | |
| 2010/0008361 A1 | 1/2010 | Guichard et al. | |
| 2010/0091779 A1 | 4/2010 | Juhl et al. | |
| 2010/0097926 A1 | 4/2010 | Huang et al. | |
| 2010/0165876 A1 | 7/2010 | Shukla et al. | |
| 2010/0165877 A1 | 7/2010 | Shukla et al. | |
| 2010/0169467 A1 | 7/2010 | Shukla et al. | |
| 2010/0182933 A1 | 7/2010 | Hu et al. | |
| 2010/0214949 A1 | 8/2010 | Smith et al. | |
| 2010/0265832 A1 | 10/2010 | Bajpay et al. | |
| 2010/0306408 A1 | 12/2010 | Greenberg et al. | |
| 2010/0329270 A1* | 12/2010 | Asati | H04L 45/00 370/401 |
| 2011/0019614 A1 | 1/2011 | O'Neill et al. | |
| 2011/0069706 A1 | 3/2011 | Sen et al. | |
| 2011/0161468 A1 | 6/2011 | Tuckey et al. | |
| 2012/0033665 A1 | 2/2012 | Jacob Da Silva et al. | |
| 2012/0069842 A1 | 3/2012 | Reddy et al. | |
| 2012/0093154 A1 | 4/2012 | Rosenberg et al. | |
| 2012/0128004 A1 | 5/2012 | Aybay et al. | |
| 2012/0155320 A1* | 6/2012 | Vohra | H04L 49/253 370/254 |
| 2012/0155453 A1 | 6/2012 | Vohra | |
| 2012/0158930 A1 | 6/2012 | Kalusivalingam et al. | |
| 2012/0158942 A1 | 6/2012 | Kalusivalingam et al. | |

FOREIGN PATENT DOCUMENTS

| | | |
|---|---|---|
| EP | 1892905 A1 | 2/2008 |
| EP | 1924030 A1 | 5/2008 |
| EP | 2164209 A1 | 3/2010 |
| EP | 2413550 A1 | 7/2011 |
| EP | 2369782 A1 | 9/2011 |
| EP | 2456138 A1 | 5/2012 |
| EP | 2466825 A1 | 6/2012 |
| EP | 2466826 A1 | 6/2012 |
| GB | 2362289 A | 11/2001 |

(56) References Cited

FOREIGN PATENT DOCUMENTS

| WO | 0008801 | 2/2000 |
|---|---|---|
| WO | 2008144927 A1 | 12/2008 |

OTHER PUBLICATIONS

Office Action for U.S. Appl. No. 12/345,498, mailed Apr. 28, 2010.
Final Office Action for U.S. Appl. No. 12/345,498, mailed Oct. 26, 2010.
U.S. Appl. No. 12/415,504, filed Mar. 31, 2009, entitled "Methods and Apparatus for Dynamic Automated Configuration Within a Control Plane of a Switch Fabric".
Office Action for U.S. Appl. No. 12/415,504, mailed Apr. 30, 2012.
Final Office Action for U.S. Appl. No. 12/415,504, mailed Oct. 10, 2012.
Office Action for U.S. Appl. No. 13/053,801, mailed Dec. 6, 2012.
Office Action for U.S. Appl. No. 12/969,233, mailed Nov. 20, 2012.
U.S. Appl. No. 12/968,846, filed Dec. 15, 2010, entitled "Host Side Protocols for Use With Distributed Control Plane of a Switch".
Office Action for U.S. Appl. No. 12/968,846, mailed Oct. 31, 2012.
U.S. Appl. No. 12/977,585, filed Dec. 23, 2010, entitled "Network Management Configuration for Retrieving and Aggregating Status Information From Resources Distributed Across a Network".
Office Action for U.S. Appl. No. 12/977,585, mailed Sep. 13, 2012.
U.S. Appl. No. 12/968,769, filed Dec. 15, 2010 entitled "Systems and Methods for Automatically Detecting Network Elements".
Office Action mailed Oct. 22, 2012 for U.S. Appl. No. 12/968,769, filed Dec. 15, 2010.
U.S. Appl. No. 12/976,075, filed Dec. 22, 2010 entitled Deriving Control Plane Connectivity During Provisioning of a Distributed Control Plane of a Switch.
Office Action mailed Nov. 7, 2012 for U.S. Appl. No. 12/968,886, filed Dec. 10, 2010.
Office Action mailed Jul. 30, 2012 for U.S. Appl. No. 12/968,957, filed Dec. 10, 2010.
Office Action mailed Sep. 17, 2012 for U.S. Appl. No. 12/951,706, mailed Sep. 17, 2012.
U.S. Appl. No. 13/435,919, filed Mar. 30, 2012, entitled "Methods and Apparatus for Virtualizing Switch Control Plane Engine".
Office Action mailed Mar. 14, 2013 for U.S. Appl. No. 13/197,212, filed Aug. 3, 2011.
U.S. Appl. No. 13/342,277, filed Dec. 22, 2011, entitled "Methods and Apparatus for Using Border Gateway Protocol (BGP) for Converged Fibre Channel (FC) Control Plane".
U.S. Appl. No. 13/333,031, filed Dec. 21, 2011, entitled "Methods and Apparatus for a Distributed Fibre Channel Control Plane".
U.S. Appl. No. 13/333,039, filed Dec. 21, 2011, entitled "Methods and Apparatus for a Distributed Fibre Channel Control Plane".
U.S. Appl. No. 13/197,212, filed Aug. 3, 2011, entitled "Methods and Apparatus for Route Installation Acknowledgement and Acknowledgement Aggregation in BGP".
Office Action mailed Mar. 25, 2013 for U.S. Appl. No. 12/969,277, filed Dec. 15, 2010.
F.K. Liotopoulos et al., "A Modular, 160 Gbps ATM Switch Architecture for Multimedia Networking Support, based on a 3-Stage Clos Network" Proceedings of the International Teletraffic Congress. ITC-16. Teletraffic Engineering in a Competitive World. Edinburgh, UK, Jun. 7, 1999, Amsterdam: Elsevier, NL, vol. 3A, XP000877657 ISBN: 978-0-444-50268-1, pp. 529-538.
K. Kompella et al., "Virtual Private LAN Service (VPLS) Using BGP for Auto-Discovery and Signaling" [online], Retrieved from the Internet: <URL: http://www.ietf.org/rfc/rfc4761.txt>, Jan. 2007, 27 pages.
Cisco Systems, Inc., "Intermediate System-to-Intermediate System (IS-IS) TLVs" Document ID: 5739 [online], Retrieved from the Internet: <URL: http://www.cisco.com/en/US/tech/tk365/technologies_tech_note09186a0080094bbd.shtml>, Aug. 10, 2005, 8 pages.
Extended Search Report for European Application No. 11158837.2, mailed Jun. 21, 2011.
Extended Search Report for European Application No. 11179603.3, mailed Dec. 21, 2011.
Extended Search Report for European Application No. 11192571.5, mailed Mar. 19, 2012.
Extended Search Report for European Application No. 11192565.7, mailed Mar. 30, 2012.
Extended Search Report for European Application No. 11174003.1, mailed Feb. 8, 2012.
Extended Search Report for European Application No. 11175433.9, mailed Oct. 7, 2011.
Border Gateway Protocol; Wikipedia, the free encyclopedia; Apr. 10, 2011; http://en.wikipedia.org/wiki/Bgp, 13 pgs.
Monia, C. et al., iFCP—A Protocol for Internet Fibre Channel Storage Networking, RFC:4172, Sep. 2005; pp. 1-111.
Tseng, J. et al., Internet Storage Name Service (iSNS), RFC:4171, Sep. 2005; pp. 1-123.
Gordon, Simon. "SAN zoning: What is zoning and what are the different types of zoning?" [online], Retrieved from the Internet: <URL: http://searchstorage.techtarget.com/tip/Zoning-part-1-An-overview-of-zoning>, Nov. 3, 2014, 2 pages.

* cited by examiner

METHODS AND APPARATUS FOR USING BORDER GATEWAY PROTOCOL (BGP) FOR CONVERGED FIBRE CHANNEL (FC) CONTROL PLANE

CROSS-REFERENCE TO RELATED APPLICATIONS

This application claims priority to and the benefit of U.S. Provisional Patent Application No. 61/426,125, filed Dec. 22, 2010, and entitled "Methods and Apparatus for Using Border Gateway Protocol (BGP) for Converged Fibre Channel (FC) Control Plane," which is incorporated herein by reference in its entirety.

BACKGROUND

Some embodiments described herein relate generally to control plane protocols for Fibre Channel (FC) networks, and, in particular, to methods and apparatus for providing a unified control plane protocol for converged FC networks.

In some known FC networks, Fibre Channel over Ethernet (FCoE) is implemented to provide a converged input/output (I/O) mechanism to carry both Internet protocol (IP) traffic and FC traffic within data planes of Ethernet networks. In FCoE, however, a separate set of control plane protocols are typically used to perform routing and to distribute databases in IP and FC networks. In such known FC networks, multiple techniques of the FC protocol can be used to distribute control information to multiple FC switches. The use of the multiple techniques of the FC protocol, however, typically results in higher network management operational expenses.

In some other known FC networks, the Internet Storage Name Service (iSNS) protocol is used to support FC over IP networks. An iSNS server, however, is typically more suited to a centralized implementation than to scale effectively to the size of data-center networks.

Accordingly, a need exists for a decentralized solution to unify control plane protocols for FC and Ethernet/IP networks, thus to decrease the network management operational expenses.

SUMMARY

In some embodiments, an apparatus includes a first Fibre Channel (FC) switch configured to be operatively coupled to an FC network device and a second FC switch. The first FC switch is configured to receive, from the FC network device, a first control packet. The first FC switch is further configured to send to the second FC switch, based on the first control packet, a second control packet defined based on a decentralized control plane protocol. The second control packet includes information associated with an FC route that is associated with the FC network device such that the second FC switch can route FC data packets to the FC network device using an FC data plane protocol.

DETAILED DESCRIPTION

Figure 1:
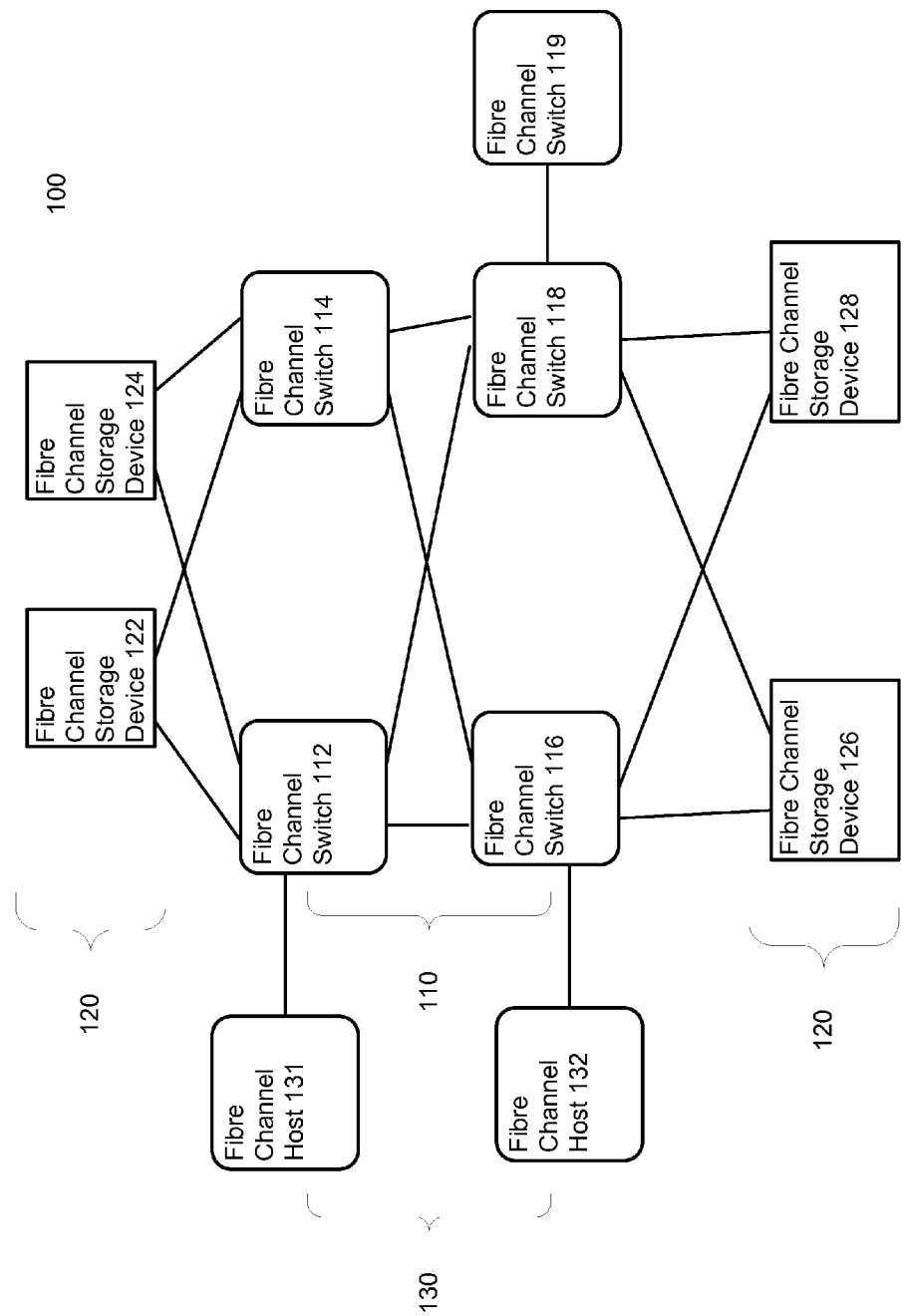
FIG. 1 is a system block diagram of an FC network, according to an embodiment.

In some embodiments, an apparatus includes a first Fibre Channel (FC) switch configured to be operatively coupled to an FC network device and a second FC switch. The first FC switch can be configured to receive, from the FC network device, a first control packet. In some embodiments, the first control packet can be defined based on an FC control plan protocol. The first FC switch can be configured to send to the second FC switch, based on the first control packet, a second control packet defined based on a decentralized control plane protocol. In some embodiments, the decentralized control plane protocol can be a Boarder Gateway Protocol (BGP). In some embodiments, the first FC switch can be configured to be operatively coupled to the second FC switch via a BGP route reflector such that the first FC switch can be configured to send the second control packet to the second FC switch via the BGP route reflector.

The second control packet can include information associated with an FC route that is associated with the FC network device such that the second FC switch can route FC data packets to the FC network device using an FC data plane protocol. In some embodiments, the information associated with the FC route can be included in a network layer reachability information (NLRI) portion of the second control packet. In some embodiments, the second control packet can include a virtual fabric identifier (VF-ID) associated with a virtual fabric that includes the FC network device. In some embodiments, the first FC switch can be configured to send a third control packet defined based on the BGP, where the third control packet can include a NLRI portion including a principle switch election priority for the first FC switch.

In some embodiments, an apparatus includes a first FC switch configured to be operatively coupled to a second FC switch within an FC network. The first FC switch can be configured to receive an update associated with an FC zone-set. The first FC switch can be configured to send, based on receiving the update, a control packet including the update associated with the FC zone-set to the second FC switch such that the second FC switch can update an FC zone-server database at the second FC switch with the update associated with the FC zone-set. The control packet can be defined based on the BGP. In some embodiments, first FC switch can be configured to be operatively coupled to the second FC switch via a BGP route reflector such that the first FC switch can be configured to send the control packet to the second FC switch via the BGP route reflector.

In some embodiments, the update associated with the FC zone-set can be included in a NLRI portion of the control packet. In some embodiments, the second FC switch can apply the FC zone-set to an FC data plane of the FC network. In some embodiments, the first FC switch can be configured to receive, from the second FC switch, a BGP acknowledgement packet indicating that the second FC switch has updated the FC zone-server database. In some embodiments, the first FC switch can be configured to send another control packet including data associated with an updated FC name-server database to the second FC switch, where the second control packet is defined based on the BGP.

In some embodiments, an apparatus includes a first FC switch configured to be operatively coupled to a second FC switch and a third FC switch. The second FC switch can be configured to use a first control plane protocol, and the third FC switch can be configured to use a second control plane protocol different than the first control plane protocol. In some embodiments, the first control plane protocol can be a BGP, and the second control plane protocol can be an FC control plane protocol or an Internet Storage Name Service (iSNS) protocol.

The first FC switch can be configured to receive, from the second FC switch, a first control packet having FC routing information. The first control packet can be defined based on the first control plane protocol. In some embodiments, the FC routing information can be within a NLRI portion of the first control packet. In some embodiments, the first control packet can include a VF-ID associated with a virtual fabric that includes the second FC switch. In some embodiments, the first FC switch can be configured to be operatively coupled to the second FC switch via a BGP route reflector such that the first FC switch can be configured to receive the first control packet from the second FC switch via the BGP route reflector.

The first FC switch can be configured to define a second control packet based on the first control packet. The second control packet can be defined based on the second control plane protocol and include the FC routing information. In some embodiments, the second control packet can be a Fabric Shortest Path First (FSPF) packet. The first FC switch can further be configured to send the second control packet to the third FC switch such that the third FC switch can implement the FC routing information. In some embodiments, the first FC switch can be configured to send the second control packet to the third FC switch such that the third FC switch can send an FC data packet to the second FC switch using an FC data plane protocol.

As used herein, a module can be, for example, any assembly and/or set of operatively-coupled electrical components, and can include, for example, a memory, a processor, electrical traces, optical connectors, software (executing or to be executed in hardware) and/or the like.

As used herein, the singular forms "a," "an" and "the" include plural referents unless the context clearly dictates otherwise. Thus, for example, the term "a switch fabric" is intended to mean a single switch fabric or a combination of switch fabrics.

FIG. 1 is a system block diagram of an FC network 100, according to an embodiment. As shown in FIG. 1, the FC network 100 includes FC switches 112, 114, 116, 118 and 119 (collectively referred to as FC switches 110), FC storage devices 122, 124, 126 and 128 (collectively referred to as FC storage devices 120), and FC hosts 131 and 132 (collectively referred to as FC hosts 130). The FC switch 112 can be coupled to the FC storage devices 122 and 124, to the FC switches 116 and 118, and to the FC host 131. Similarly, the FC switch 114 can be coupled to the FC storage devices 122 and 124, and to the FC switches 116 and 118; the FC switch 116 can be coupled to the FC storage devices 126 and 128, to the FC switches 112 and 114, and to the FC host 132; the FC switch 118 can be coupled to the FC storage devices 126 and 128, and to the FC switches 112, 114 and 119.

Each of the FC hosts 130 and FC storage devices 120 can be any combination of hardware and/or software (executing or to be executed in hardware) capable of transmitting information and data to and/or receiving information and data from the FC switches 110 based on one or more FC protocols. In some embodiments, each FC host 130 can be, for example, a computer device, a server device, an application server, a workstation, a routing device, and/or the like. Each FC storage device 120 can be, for example, a database system, a storage device, and/or the like. In some embodiments, one or more FC hosts 130 and/or FC storage devices 120 can perform one or more computing tasks, such as one or more data storage, Software as a Service (SAS), web service, content request, or other computing tasks. In some embodiments, the FC hosts 130 and/or FC storage devices 120 can be connected to one or more FC switches 110 via, for example, one or more line cards. For example, the FC storage device 122 can host two line cards, one connected to the FC switch 112 and the other connected to the FC switch 114.

In some embodiments, the FC hosts 130 and the FC storage devices 120 can be (operatively) coupled to and in communication with the FC switches 110 via any suitable connection such as, for example, an optical connection (e.g., an optical cable and optical connectors), an electrical connection (e.g., an electrical cable and electrical connectors), a wireless connection (e.g., wireless transceivers and antennas), and/or the like. As such, each FC host 130 and each FC storage device 120 can be configured to send FC data (e.g., FC packets and/or frames) to and receive FC data from the FC switches 110. In some embodiments, each connection between the FC hosts 130 and the FC switches 110, or each connection between the FC storage devices 120 and the FC switches 110, is a direct link. In other embodiments, the FC hosts 130 and the FC storage devices 120 can be operatively coupled to the FC switches 110 via intermediate devices or modules (not shown in FIG. 1).

Each of the FC switches 110 can be any network switch compatible with the Fibre Channel protocol (FCP). Specifically, each FC switch 110 can be any combination of hardware and/or software (executing or to be executed in hardware) configured to perform switching of FC data (e.g., FC packets, FC frames) received from the FC hosts 130, the FC storage devices 120, and/or other FC switches 110. In some embodiments, for example, each FC switch 110 can include a field-programmable gate array (FPGA), an application specific integrated circuit (ASIC), a digital signal processor (DSP) and/or the like. In some embodiments, the FC switches 110 can be, for example, access switches, input/output modules, top-of-rack devices and/or the like.

In some embodiments, an FC switch 110 can be a single physical device. Such an FC switch 110 can be, for example, a switching device capable of switching FC data that is received at that FC switch 110. In some other embodiments, an FC switch 110 can comprise of multiple physical devices. In such embodiments, the FC switch 110 can be or include, for example, an FC switch fabric. Such an FC switch fabric can be, for example, a multi-stage FC switch fabric that includes multi-stage FC switching devices. In some embodiments, an FC switch 110 can be or included in, for example, a data center. In some embodiments, an FC switch 110 can be configured to include one or more logical hierarchical elements, such as, for example, virtual data center fabrics (VDCFs). Furthermore, in some embodiments, the FC switches 110 can be referred to as Fibre Channel Forwarders (FCFs).

Figure 2:
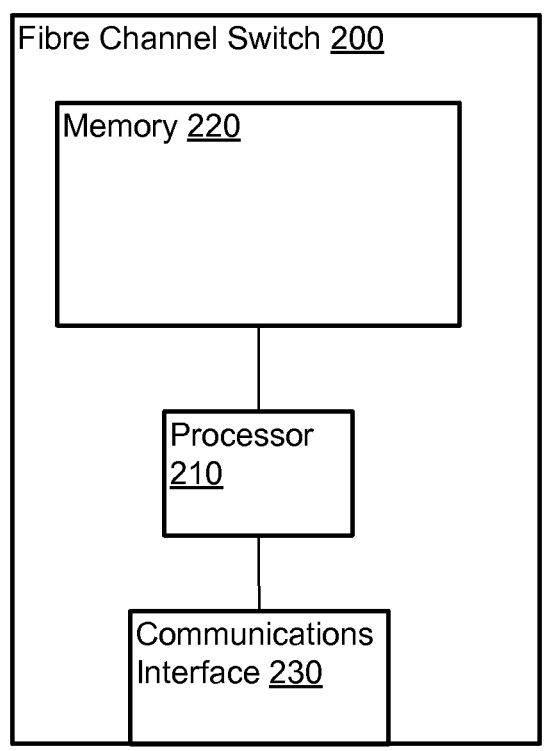
FIG. 2 is a schematic illustration of an FC switch, according to an embodiment.

FIG. 2 is a schematic illustration of an FC switch 200, according to an embodiment. The FC switch 200 can be structurally and functionally similar to the FC switches 110 described in connection with FIG. 1 above. As shown in FIG. 2, the FC switch 200 includes a processor 210, a memory 220, and a communications interface 230. The processor 210 is operatively coupled to the memory 220 and the communications interface 230.

The memory 220 can be, for example, a random-access memory (RAM) (e.g., a dynamic RAM, a static RAM), a flash memory, a removable memory, and/or so forth. In some embodiments, the memory 220 can include or store, for example, a process, application, virtual machine, and/or some other software modules (executing or to be executed in hardware) or hardware modules configured to switch FC data that is received at the FC switch 200 (e.g., via the communications interface 230). In such embodiments, instructions of performing the switching function can be stored within the memory 220 and executed at the processor 210.

The communications interface 230 can include and be configured to manage one or multiple ports of the FC switch 200. In some embodiments, for example, the communications interface 230 can include one or more line cards, each of which can include one or more ports coupled to other devices (e.g., FC switches, FC storage devices, FC hosts). A port included in the communications interface 230 can be any entity that can actively communicate with a coupled device or over a network. In some embodiments, such a port need not necessarily be a hardware port, but can be a virtual port or a port defined by software. In some embodiments, the connections between the communications interface 230 and other device(s) can implement a physical layer using, for example, fiber-optic signaling via fiber-optic cables or other suitable connection means.

In some embodiments, the FC switch 200 can be coupled to and communicate with different types of devices using various types of ports included in the communications interface 230. For example, the FC switch 200 can be connected to an FC node device, such as an FC storage device (e.g., the FC storage devices 120 in FIG. 1) or an FC host (e.g., the FC hosts 130 in FIG. 1), via an FC F-port included in the communications interface 230. Such an FC F-port can also be known as an FC Fabric port. In some embodiments, the FC F-port can be connected to a port on the node device (in some embodiments referred to as an N-port, or a node port) using the FC Point-to-Point (FC-P2P) topology or the FC switched fabric (FC-SW) topology. For another example, the FC switch 200 can be connected to another FC switch via an FC E-port included in the communications interface 230. Such an FC E-port can also be known as an FC Expansion port. In some embodiments, the FC E-port of the FC switch 200 can be connected to an FC E-port of the other FC switch. Thus, the two FC E-ports can form a link between the two FC switches, which can be referred to as an inter-switch link (ISL).

The processor 210 can be configured to control the operations of the communications interface 230 and the memory 220. Among other operations, the processor 210 can be configured to manage the ports (e.g., FC F-ports, FC E-ports) of the communications interface 230 that are connected to other devices. Thus, the FC switch 200 can communicate with other devices (e.g., FC switches, FC storage devices, FC hosts) via the communications interface 230. The processor 210 can also be configured to write data into and read data from the memory 220, and execute the instructions stored within the memory 220. Specifically, the processor 210 can be configured to execute instructions associated with performing typical network switching functions on FC data (e.g., FC packets, FC frames) received at the FC switch 200. The FC switch 200 can, for example, receive an FC frame from an FC host (e.g., the FC host 130 in FIG. 1) coupled to the FC switch 200 and send that FC frame towards a destined FC storage device (e.g., the FC storage device 120) to which the FC switch 200 is operatively coupled.

Returning to FIG. 1, the FC network 100 can include a data plane and a control plane. The data plane of the FC network 100 can be used to facilitate transmissions of FC data (e.g., FC data packets) between the FC hosts 130, the FC storage devices 120, and/or other devices (not shown in FIG. 1) coupled to the FC network 100. In some embodiments, the data plane of the FC network 100 can include a distributed FC switch fabric having multiple stages. In such embodiments, the FC switches 112, 114, 116, 118 and 119 can be included in the multi-stage FC switch fabric. For example, the data plane of the FC network 100 can be a Clos switch fabric network (e.g., a non-blocking Clos network, a strict sense non-blocking Clos network, a Benes network) having multiple stages of switching modules (e.g., FC switches 110). In some embodiments, such a distributed multi-stage switch fabric can include any number of stages.

In some embodiments, the data plane of the FC network 100 can be configured to implement one or more protocols to transmit data through the FC network 100. Such protocols can include, for example, an FCP, an FCoE protocol, an Ethernet protocol, a multi-protocol label switching (MPLS) protocol, an FC over MPLS (FCoMPLS) protocol, an Infiniband-related protocol, and/or the like. In some embodiments, each FC switch 110 can have converged enhanced Ethernet (CEE) and/or Fibre Channel interfaces providing FCoE and/or Fibre Channel connectivity to the FC hosts 130 and/or FC storage devices 120 (e.g., via its set of ports) coupled to that FC switch 110. In such embodiments, the FC switch 110 can function as an FCF to the directly attached FC hosts 130 and/or FC storage devices 120.

Figure 4:
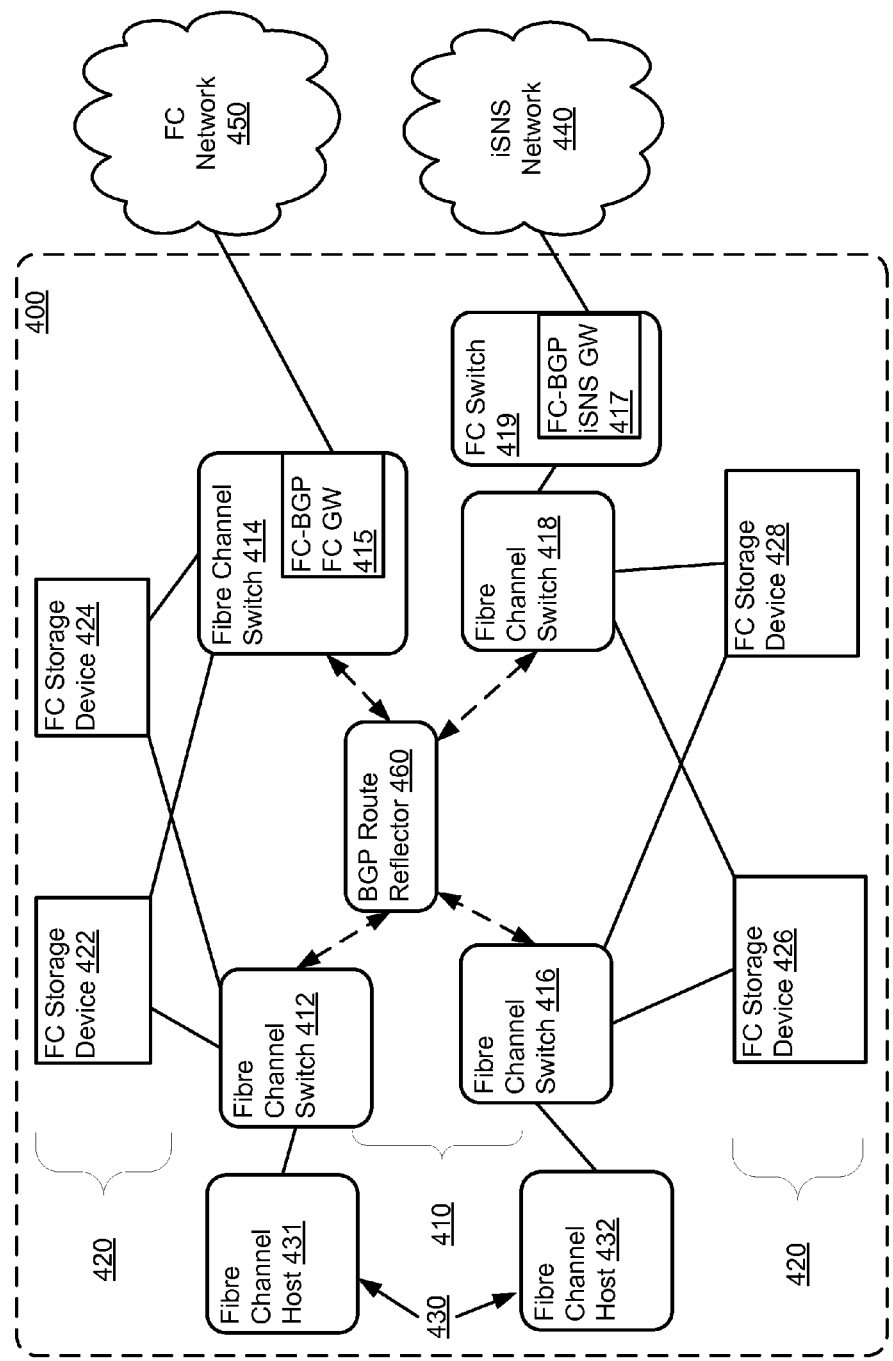
FIG. 4 is a system block diagram of an FC-BGP network connected to an iSNS network and an FC network, according to an embodiment.

The control plane of the FC network 100 can facilitate transmission of control signals (e.g., control packets containing configuration information, routing information, etc.) between the FC hosts 130, the FC storage devices 120, and/or the FC switches 110. The control plane of the FC network 100 can include the FC switches 112-119 and/or other switching devices that are not shown in FIG. 1. In some embodiments, the control plane of the FC network 100 can include a control plane portion of a communications network that operatively couples the FC switches 112-119. In some embodiments, the control plane of the FC network 100 can include direct links between the FC switches 110 and the remaining FC switches 110. In some other embodiments, the control plane of the FC network 100 can include intermediate modules and/or switching devices (not shown in FIG. 1, e.g., a BGP router reflector as shown in FIG. 4) to operatively couple the FC switches 110 with remaining FC switches 110. Furthermore, in some embodiments, the BGP can be used to manage the control plane of the FC network 100. Specifically, the BGP can be used to provide a unified control plane for a converged FC/Ethernet/IP control plane for the FC network 100, as described in further details below.

In some embodiments, an FC host 130 or an FC storage device 120 can be configured to send a first control packet to a first FC switch 110 coupled to that FC host 130 or FC storage device 120. The first control packet can include control information associated with the FC host 130 or the FC storage device 120. The control information can be intended to be sent to a second FC switch 110 coupled (operatively or directly) to the first FC switch 110, such that the second FC switch 110 can be configured and/or updated accordingly. For example, the first control packet can include routing information of an FC route associated with that FC host 130 or FC storage device 120. For another example, the first control packet can include an update associated with an FC zone-set to which that FC host 130 or FC storage device 120 belongs.

In some embodiments, the first control packet can be defined based on a known FC protocol such as, for example, the FCP, the FCoE protocol, the FC over MPLS protocol, and/or the like. In such embodiments, the known FC protocol can be implemented at the interfaces connecting the FC host 130 or the FC storage device 120 to the first FC switch. Similarly stated, one or more known FC protocols can be implemented to connect the FC switches 110 and the FC hosts 130, and to connect the FC switches 110 and the FC storage devices 120.

For example, the FC host 131 can be configured to define and then send a first control packet to the FC switch 112. The first control packet can include, for example, routing information of a route associated with the FC host 131, or an update associated with an FC zone-set to which the FC host 131 belongs. The control information included in the first control packet can be intended to be sent to, for example, the FC switch 119, such that the FC switch 119 can be configured and/or updated accordingly (e.g., to implement the routing information). Furthermore, the first control packet can be defined at the FC host 131 and sent to the FC switch 112 based on, for example, the FCoE protocol.

In some embodiments, in response to receiving such a first control packet, the first FC switch 110 can be configured to define a second control packet based on the received first control packet, such that the second control packet can include the control information carried by the first control packet. In some embodiments, the second control packet can be defined at the first FC switch 110 based on a decentralized control plane protocol that is different from the FC protocol associated with the first control packet. In some embodiments, the decentralized control plane protocol can be partially implemented in the FC network 100. Specifically, in some embodiments, the decentralized control plane protocol can be implemented in, for example, a portion of the FC network 100, and another control plane protocol (e.g., a typical FC control plane protocol) can be implemented in the remaining portion of the FC network 100. In some other embodiments, a portion of the functionality provided by the decentralized control plane protocol can be decentralized across, for example, the FC switches 110 in the FC network 100, and the remaining portion of the functionality provided by the decentralized control plane can be implemented in a centralized fashion (e.g., via a centralized server device) in the FC network 100.

In some embodiments, the second control packet can be defined based on the BGP. In some embodiments, such a decentralized control plane protocol (e.g., BGP) can be implemented between the FC switches 110 in the FC network 100. Subsequently, such a second control packet can be sent from the first FC switch 110 to the destined second FC switch 110 based on, for example, the BGP. For example, in response to receiving the first control packet from the FC host 131, the FC switch 112 can be configured to define a second control packet based on the received first control packet. The second control packet can include the control information carried by the first control packet, such as the routing information associated with the FC host 131, or the update associated with the FC zone-set to which the FC host 131 belongs. In some embodiments, the second control packet can be defined at the FC switch 112 based on the BGP. The FC switch 112 can then be configured to send the second control packet towards the FC switch 119 (e.g., via the FC switch 118) using the BGP.

In some embodiments, the first FC switch 110 can be configured to define a control packet, which is similar to the second control packet described above, without receiving any control packet or information from an FC host 130 or FC storage device 120. Specifically, the first FC switch 110 can be configured to define the control packet destined to the second FC switch 110 based on, for example, control information stored within the first FC switch 110. For example, the first FC switch 110 can be configured to define a control packet based on data associated with an updated FC name-server database within or coupled to the first FC switch 110. For another example, the first FC switch 110 can be configured to define a control packet to include information associated with a principle switch election priority for the first FC switch 110. Similar to the second control packet described above, the control packet defined based on the control information stored in the first FC switch 110 can also be destined to, for example, the second FC switch 110.

Figure 3:
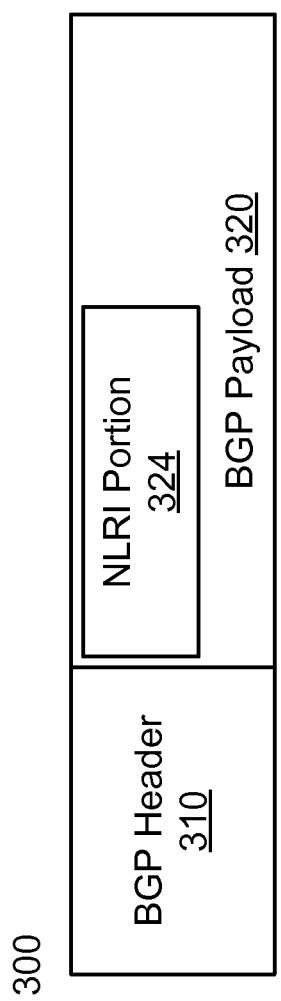
FIG. 3 is a schematic illustration of an FC control packet defined based on the border gateway protocol (BGP), according to an embodiment.

FIG. 3 is a schematic illustration of an FC control packet 300 defined based on the BGP, according to an embodiment. The FC control packet 300 can be structurally and functionally similar to the control packet defined (based on the received control packet or not) at the first FC switch 110 as described above with respect to FIG. 1. Specifically, the FC control packet 300 can be defined at, for example, a first FC switch (e.g., the FC switch 112 in FIG. 1) and destined to, for example, a second FC switch (e.g., the FC switch 119 in FIG. 1). In some embodiments, the FC control packet 300 can be defined at the first FC switch based on a control packet received from an FC device (e.g., an FC host, an FC storage device) coupled to the first FC switch. Alternatively, the FC control packet 300 can be defined based on control information stored within the first FC switch.

As shown in FIG. 3, the FC control packet 300 is encapsulated using the BGP. The FC control packet 300 has a BGP header 310 and a BGP payload 320. The BGP header 310 can be defined based on the source (i.e., the first FC switch) and/or the destination (i.e., the second FC switch) associated with the FC control packet 300, such that the FC control packet 300 can be sent from the first FC switch to the second FC switch using the BGP. The BGP payload 320 can include the control information that is intended to be sent to the second FC switch, including, for example, the control information received at and/or stored within the first FC switch. Furthermore, the BGP payload 320 can include an NLRI portion 324, which can be used to transmit various FC related information, as described below.

In some embodiments, the first FC switch can be configured to define the FC control packet 300 by encapsulating the intended control information into the BGP payload 320 using the BGP (i.e., adding the BGP header 310). Similarly, upon receiving the FC control packet 300 from the first FC switch, the second FC switch can be configured to decapsulate the FC control packet 300 (i.e., removing the BGP header 310) and thus retrieve the intended control information from the BGP payload 320.

In some embodiments, the NLRI portion 324 can be configured to include information associated with an FC route. In this context, the FC control packet 300 can be or include a BGP update/withdraw message, and the NLRI portion 324 can be a prefix in the BGP update/withdraw message. Other attributes of the route can be included in other portions of the BGP payload 320. In some embodiments, as described herein with respect to FIG. 1, the NLRI portion of an FC control packet can be used to transmit FC routing information among FC switches. In some embodiments, the NLRI portion 324 can be configured to include information associated with update of an FC zone-set. The FC zone-set can be the FC zone-set that includes the first FC switch and/or the FC device (e.g., an FC host, an FC storage device) that sent the control packet to the first FC switch. In some embodiments, the NLRI portion 324 can be configured to include information associated with a principle switch election priority for the first FC switch, as described herein with respect to FIG. 5.

In some embodiments, although not described herein, other control information such as configuration information (e.g., port protocol information, network segment assignment information, port assignment information, FC device information, etc.), forwarding-state information (e.g., port identifiers, network segment identifiers, FC device identifiers, etc.), and/or the like can be included in other portions of the BGP payload 320.

Returning to FIG. 1, after the control packet is defined at the first FC switch 110, the first FC switch 110 can be configured to send the control packet to the destined second FC switch 110. In some embodiments, the control packet can be sent based on, for example, the BGP. In some embodiments, the BGP can be used to distribute control information (e.g., included in one or multiple control packets) to one or multiple FC switches 110 within the FC network 100. In such embodiments, the BGP can be used to replace various techniques provided by, for example, known FC protocols (e.g., FCoE, FCP). In some embodiments, some specific extensions can be included in the BGP such that the extended BGP can be implemented in an FC network. In some embodiments, such an extended and FC-specific BGP can be referred to as an FC-BGP protocol; and an FC network implementing the FC-BGP protocol can be referred to as an FC-BGP network (e.g., compared with a typical FC network). For example, the FC network 100 shown and described with respect to FIG. 1 is an example of an FC-BGP network. Features of such an FC-BGP protocol and FC-BGP network are described in further details below.

In some embodiments, the capability negotiation function of the BGP can be used to disseminate FC route and/or databases across the FC switches 110 in the FC network 100. In such embodiments, the BGP capability negotiation can be extended, in the FC-BGP protocol, to advertise FC route/database information as a capability of the FC-BGP protocol. Specifically, each FC switch 110 can be configured to run the FC-BGP (i.e., BGP with extensions) to disseminate FC route and/or databases associated with that FC switch 110 or an FC device (e.g., an FC host 130, an FC storage device 120) coupled to that FC switch 110. In some embodiments, for example, control packets in the form of BGP messages can be exchanged between the FC switches 112, 114, 116 and 118 such that information associated with an FC route for the FC host 131 can be disseminated from the FC switch 112 to the FC switches 114, 116 and 118.

In some embodiments, the FC-BGP protocol can be used to transmit a (updated) zone-server database between the FC switches 110 in the FC network 100. As a result, the FC-BGP protocol can be used to replace, for example, the zone-server flooding technique that can be used to distribute a zone database in a typical FC network. In some embodiments, a configured zone-server database can have multiple zone-sets. Each zone-set can be advertised, using the FC-BGP protocol, as a sequence of NLRI portions included in one or multiple FC control packets. In some embodiments, the zone-sets can be advertised atomically. In such embodiments, each NLRI can include a series of information associated with the zone-set, such as, for example, a zone-set name, whether the zone-set is active or not, a beginning-of-zone-set marker, an end-of-zone-set marker, a sequence number, and/or the like. Furthermore, in some embodiments, each NLRI portion can include a generation identifier associated with the zone-set that can be used to detect multiple versions of the same zone-set. Such a generation identifier included in the NLRI portion of the FC control packets can be similar to the generation identifiers described in co-pending U.S. patent application Ser. No. 13/190,059, filed Jul. 25, 2011, and entitled "Methods and Apparatus related to Route Selection within a Network," which is incorporated herein by reference in its entirety.

In some embodiments, to synchronize the commit process for an active zone-set, a stage NLRI can be defined for each stage of commit for a zone-set. Such a stage NLRI can be configured to, using the BGP, synchronize the commit process across FC switches 110. In some embodiments, each stage NLRI can include, for example, a zone-set name, a stage number, and/or other information associated with the zone-set and the corresponding stage. In some embodiments, a recipient FC switch 110 can use an end-to-end BGP acknowledgement mechanism to acknowledge to the originating FC switch 110 that the recipient FC switch 110 has processed the corresponding stage of zone-set commit Specifically, in response to receiving the stage NLRI and processing the corresponding stage of zone-set commit accordingly, the recipient FC switch 110 can be configured to send a BGP acknowledgement packet to the originating FC switch 110. The BGP acknowledgement packet can indicate that the recipient FC switch 110 has updated the FC zone-server database based on the received stage NLRI (e.g., processed the corresponding stage of zone-set commit).

In some embodiments, the FC-BGP protocol can be used to transport an FC-proxy-mode database within the FC network 100. In the FC proxy mode, an FC-proxy switch (e.g., an FC switch 110) can be configured to proxy on behalf of multiple FC N-ports (i.e., FC node ports) associated with that FC proxy switch to an FCF switch (e.g., another FC switch 110), and vice versa. In such embodiments, to perform a successful login to the FCF switch on behalf of an FC N-port, the FC-proxy switch can be configured to perform the login operation using a new BGP NLRI including the world wide name (WWNs) of that FC N-port. Upon doing a successful login, the FCF switch can be configured to advertise back to the FC-proxy switch the assigned FC-ID using, for example, another BGP NLRI that includes the WWN and the assigned FC-ID for the FC N-port. When the FC N-port logs out, the FC-proxy switch can be configured to withdraw the login NLRI corresponding to that FC N-port. Subsequently, the FCF switch can withdraw the advertised FC-ID for that FC N-port.

FIG. 4 is a system block diagram of an FC-BGP network 400 connected to an iSNS network 440 and an FC network 450, according to an embodiment. As shown in FIG. 4, the FC-BGP network 400 includes FC switches 412, 414, 416, 418 and 419 (collectively referred to as FC switches 410), FC storage devices 422, 424, 426 and 428 (collectively referred to as FC storage devices 420), and FC hosts 431 and 432 (collectively referred to as FC hosts 430). The FC switches 410 can be structurally and functionally similar to the FC switches 110 shown and described with respect to FIG. 1. Similarly, the FC storage devices 420 and the FC hosts 430 can be structurally and functionally similar to the FC storage devices 110 and the FC hosts 130, respectively, shown and described with respect to FIG. 1.

Similar to the FC network 100 in FIG. 1, the FC switch 412 can be coupled to the FC storage devices 422 and 424, and to the FC host 431. The FC switch 414 can be coupled to the FC storage devices 422 and 424. The FC switch 416 can be coupled to the FC storage devices 426 and 428, and to the FC host 432. The FC switch 418 can be coupled to the FC storage devices 426 and 428, and to the FC switch 419. Furthermore, the FC switches 412, 414, 416 and 418 can be coupled to a BGP route reflector 460. In some embodiments, the FC switches 412, 414, 416 and 418 can be directly coupled to the BGP route reflector 460. In some other embodiments, the FC switches 412, 414, 416 and 418 can be operatively coupled to the BGP route reflector 460 via, for example, one or multiple other FC switches 410 and/or other switching devices.

The BGP route reflector 460 can be any network routing device that can be configured to route data and/or information (e.g., control packets) within the FC-BGP network 400. Specifically, the BGP route reflector 460 can be configured to receive control packets from a first FC switch 410 and send the received control packets to a second FC switch 410. In some embodiments, the control packets received at the BGP route reflector 460 can be defined at the first FC switch 410 based on the BGP. Those control packets can be sent from the first FC switch 410 to the BGP route reflector 460 and then sent from the BGP route reflector 460 to the second FC switch 410 based on the BGP. Thus, the FC switches 412, 414, 416 and 418 can be configured to transmit control packets to the remaining FC switches 412, 414, 416 and 418 via the BGP route reflector 460.

In some embodiments, an FC network that implements the BGP to transmit control packets between FC switches within the control plane of that FC network can be connected to other types of network, including, for example, iSNS networks, FC networks, converged FC networks, etc. In some embodiments, an iSNS network (e.g., the iSNS network 440 in FIG. 4) can include, for example, an iSNS server configured to transfer FC data within the iSNS network. In some embodiments, an iSNS network can provide support for Internet Small Computer System Interface (iSCSI) standard and Internet Fibre Channel Protocol (iFCP) standard by defining the databases that are used to support the iFCP and iSCSI standards.

As shown in FIG. 4, the FC-BGP network 400 can be connected to an FC network 150. Specifically, the FC network 450 can be connected to the FC-BGP to FC gateway 415 of the FC switch 414. The FC-BGP to FC gateway 415 can be a combination of hardware and/or software (executing or stored in hardware) capable of providing an interface between an FC network (e.g., the FC network 450) and an FC-BGP network (e.g., the FC-BGP network 400). Specifically, the FC-BGP to FC gateway 415 can be configured to provide an interface to the FC network 450 using known FC protocols (e.g., FCoE, FCP), and provide an interface to the FC-BGP network 400 using the FC-BGP protocol discussed herein. In some embodiments, the FC-BGP to FC gateway 415 can include gateway extensions that map the known FC protocols to the FC-BGP protocol and vice versa.

Similarly, the FC-BGP network 400 can be connected to the iSNS network 440. Specifically, the iSNS network 440 can be connected to the FC-BGP to iSNS gateway 417 of the FC switch 419. Similar to the FC-BGP to FC gateway 415, the FC-BGP to iSNS gateway 417 can be a combination of hardware and/or software (executing or stored in hardware) capable of providing an interface between an iSNS network (e.g., the iSNS network 440) and an FC-BGP network (e.g., the FC-BGP network 400). Specifically, the FC-BGP to iSNS gateway 417 can be configured to provide an interface to the iSNS network 440 using the iSNS protocol, and provide an interface to the FC-BGP network 400 using the FC-BGP protocol discussed herein. In some embodiments, the FC-BGP to iSNS gateway 415 can include gateway extensions that map the iSNS protocol to the FC-BGP protocol and vice versa.

As a result of the FC-BGP network 400 being connected to the FC network 450 (i.e., via the FC-BGP to FC gateway 415) and the iSNS network 440 (i.e., via the FC-BGP to iSNS gateway 417), control packets containing FC routing information can be transmitted between the FC-BGP network 400 and the FC network 450, and between the FC-BGP network 400 and the iSNS network 440. In some embodiments, the FC switch 414 and the FC switch 419 can be configured to receive control packets from other FC switches 410 within the FC-BGP network 400. The control packets can be defined and sent based on the BGP. The FC switch 414 and the FC switch 419 can be configured to define control packets based on the received control packets such that the defined control packets can include control information carried by the received control packets. The FC switch 414 and the FC switch 419 can then be configured to send the defined control packets to the FC network 450 and the iSNS network 440, respectively. More specifically, the FC switch 414 can be configured to define the control packets based on an FC protocol compliant with the FC network 450, and then send the control packets to, for example, an FC switch (not shown in FIG. 4) within the FC network 450. In some embodiments, such an FC protocol can be, for example, the FSPF protocol. Similarly, the FC switch 419 can be configured to define the control packets based on a protocol (e.g., the iSNS protocol) compliant with the iSNS network 440, and then send the control packets to, for example, a device (not shown in FIG. 4) within the iSNS network 440. As a result, in response to receiving the control packets, the FC switch within the FC network 450 and the device within the iSNS network 440 can respectively take actions accordingly based on the control information included in the received control packets.

For example, the FC switch 412 can send FC routing information associated with the FC switch 412 to an FC switch within the FC network 450. The FC switch 412 can be configured to define a first control packet to include the associated FC routing information. The first control packet can be defined at the FC switch 412 based on the BGP, similar to the control packet 300 shown and described with respect to FIG. 3. As described herein, the FC routing information can be included within, for example, a NLRI portion of the first control packet. Furthermore, the FC switch 412 can be configured to send the first control packet to the FC switch 414 via the BGP route reflector 460 based on the BGP. In response to receiving the first control packet, the FC switch 414 can be configured to define a second control packet to include the FC routing information carried by the first control packet. The second control packet can be defined at the FC switch 414 based on, for example, the FSPF protocol. Thus, the second control packet can be an FSPF packet. The FC switch 414 can then be configured to send the second control packet to the FC switch within the FC network 450 via the FC-BGP to FC gateway 415. In response to receiving the second control packet, the FC switch within the FC network 450 can be configured to implement the FC routing information included in the second control packet. As a result, the FC switch within the FC network 450 can be enabled to send data packets to the FC switch 412 via the data planes of the FC network 450 and the FC-BGP network 400.

For another example, the FC switch 416 can send a VF-ID associated with a virtual fabric (not shown in FIG. 4) that includes the FC switch 416 to a switching device within the iSNS network 440. The FC switch 416 can be configured to define a first control packet to include the associated information of the VF-ID. The first control packet can be defined at the FC switch 416 based on the BGP, similar to the control packet 300 shown and described with respect to FIG. 3. Furthermore, the FC switch 416 can be configured to send the first control packet to the FC switch 419 via the BGP route reflector 460 and the FC switch 418 based on the BGP. In response to receiving the first control packet, the FC switch 419 can be configured to define a second control packet to include the associated information of the VF-ID carried by the first control packet. The second control packet can be defined at the FC switch 419 based on, for example, the iSNS protocol. The FC switch 419 can then be configured to send the second control packet to the switching device within the iSNS network 440 via the FC-BGP to iSNS gateway 417. In response to receiving the second control packet, the switching device within the iSNS network 440 can be configured to update, for example, a virtual fabric database accordingly based on the associated information of the VF-ID included in the second control packet.

In some embodiments, the FC-BGP protocol can be used to transmit FC routing information in the FC-BGP network 400. As a result, the FC-BGP protocol can be used to replace, for example, the FSPF flooding technique that can be used to distribute FC routing information in a typical FC network. In some embodiments, specifically, an NLRI portion of an FC control packet (e.g., the NLRI portion 324 of the FC control packet 300 in FIG. 3) can be used to carry an FC route such that the FC route can be distributed from a first FC switch 410 to one or more other FC switches 410. The FC route can be associated with the first FC switch 410 or an FC device (e.g., an FC host 430, an FC storage device 420) coupled to the first FC switch 410. The NLRI portion of the FC control packet can include, for example, a VF-ID of a virtual fabric (if such a virtual fabric exists) that includes the first FC switch 410 or the FC device, an FC-ID of the first FC switch 410 or the FC device, a prefix-mask value, and/or an FCF next-hop. In some embodiments, the FCF next-hop can be, for example, an FC switch 410 or other device (e.g., a BGP route reflector) that acts as the next-hop for the FC control packet.

In response to receiving the FC control packet from the first FC switch 410, a second FC switch 410 can be configured to retrieve the FC route included in the NLRI portion of the FC control packet. The second FC switch 410 can then be configured to implement the FC route at the second FC switch 410. As a result, in some embodiments, the second FC switch 410 can be configured to route FC data packets to the first FC switch 410, or the FC device coupled to the first FC switch 410 (e.g., via the first FC switch 410), using the data plane of the FC-BGP network 400.

In some embodiments, appropriate route-target (as described with respect to FIG. 5) and/or nexthop-modification techniques can be used to define various connectivity topologies for the set of FC switches 410. The FC control packet can be used to advertise various types of FC routes, each containing various control information associated with an FC route, an FC switch 410, and/or an associated FC device. In some embodiments, the FC control packet can be used to advertise FC routes containing information associated with domain identifiers (domain-IDs) that are hosted by the first FC switch 410. In such embodiments, the prefix-mask included in the NLRI portion of the FC control packet can refer to, for example, the FC-ID (e.g., 8 bits) of the first FC switch 410.

In some embodiments, the first FC switch 410 can be configured to act as a proxy for multiple domains that are associated with the first FC switch 410. For example, the first FC switch 410 can be a gateway to, for example, another FC network and/or an iSNS network connected to the FC network 100 (similar to the FC switch 414 and the FC switch 419 in FIG. 4). For another example, the first FC switch 410 can have one or more sub-domain identifiers. In such embodiments, the first FC switch 410 can be configured to advertise the multiple FC-IDs associated with the multiple domains to other FC switches 410. Furthermore, in some embodiments, the first FC switch 410 can be configured to aggregate the multiple FC-IDs into one identifier, if the multiple FC-IDs are capable of being aggregated as per configuration. In such embodiments, the prefix-mask included in the NLRI portion of the FC control packet can refer to a length smaller than 8 bits of the FC-ID.

For example, the FC switch 414 can be configured to distribute an FC route associated with the FC switch 414 to the FC switches 412, 416, 418 and 419. The FC switch 414 can be configured to send an FC control packet (in the form of a BGP message) containing the FC route to the FC switches 412, 416, 418 and 419 via the BGP route reflector 460. As described herein, the FC switch 414 can be configured to act as a proxy for both the FC network 450 (with respect to the FC-BGP network 400) and the FC-BGP network 400 (with respect to the FC network 450). Thus, the FC switch 414 can be configured to advertise both an FC-ID associated with the FC network 450 and an FC-ID associated with the FC-BGP network 400 to other FC switches 410. Furthermore, in some embodiments, the FC switch 414 can be configured to aggregate the two FC-IDs into one identifier and include it in the NLRI portion of the FC control packet that is distributed to the other FC switches 410.

The FCF next-hop can be identified in the FC control packet (BGP message) using various suitable means. In some embodiments, if FCoE or any other media over which FCoE can be implemented (e.g., FCoE-over-MPLS) is enabled in the FC-BGP network 400, the FCF next-hop can be identified based on the FCF next-hop's Ethernet MAC address. In such embodiments, reachability to the FCF next-hop's MAC address can be derived from, for example, underlying Ethernet MAC address reachability discovery mechanism such as MAC-VPN (virtual private network), VPLS (virtual private LAN service), known STP (spanning tree protocol), and/or the like. In some embodiments, if FC-over-MPLS is enabled in the FC-BGP network 400, the FCF next-hop can be identified based on an MPLS label associated with the FCF next-hop. In such embodiments, a separate MPLS label can be advertised for each destined FC switch 410 if that destined FC switch 410 is not capable of performing an FC-ID lookup in conjunction with an MPLS lookup. In some embodiments, if FC-over-IP or FC-over-MPLS is enabled in the FC-BGP network 400, the FCF next-hop can be identified based on an IP address or a GRE (generic routing encapsulation) address associated with the FCF next-hop. In some embodiments, the FCF next-hop can be identified based on an FC-ID of the FCF next-hop. In such embodiments, the route to the FCF next-hop can be resolved using, for example, FSPF on the FC links between the FC switches 410 in the FC-BGP network 400.

In some embodiments, the FC-BGP protocol can be used to transmit a (updated) name-server database and generate registered state change notifications (RSCNs) and/or state change notifications (SCNs) within the FC-BGP network 400. As a result, the FC-BGP protocol can be used to replace, for example, the RSCN technique in conjunction with the name-server GET requests that are used to update name-server databases in a typical FC network.

In some embodiments, each FC switch 410 can be configured to store and maintain a name-server database, which stores information associated with the FC devices (e.g., FC storage devices 420, FC hosts 410) that are directly connected to that FC switch 410 (e.g., via an FC N-port), as well as other FC devices. After a change occurs to an FC device directly connected to the FC switch 410, the FC switch 410 can be configured to generate SCN or RSCN messages reporting that change in the name-server database, and then send the SCN or RSCN messages to the FC devices directly connected to the FC switch 410 via the FC N-ports. The FC switch 410 can also be configured to generate and send, based on the BGP, one or more control packets including data associated with the updated name-server database to other FC switches 410. Thus, the other FC switches 410 can be configured to update their name-server databases accordingly. Furthermore, in some embodiments, the control packets can include a full updated name-server database including information associated with each FC device directly coupled to the FC switch 410.

In some embodiments, to distribute an updated name-server database across the FC switches 410 using FC control packets, an appropriate NLRI portion can be defined in those control packets to describe a device (e.g., an FC storage device 420, an FC host 430) associated with the updated name-server database. Such an NLRI portion can be similar to the NLRI portion 324 of the FC control packet 300 shown and described with respect to FIG. 3. In some embodiments, the NLRI portion can contain multiple attributes associated with the device and/or a port at the FC switch 410 to which the device is connected. The attributes can include, for example, the WWN and/or a symbolic-name for the port, the WWN or a symbolic-name for the device or the FC switch 410, port type, class of service, FC-4 types/descriptors/features, a generation ID that can be used to trigger SCN messages to be sent without any change in the name-server database, iSNS-specific information, port identifier, fabric port WWN, hard address, port IP address, SCN bitmap, permanent port name, etc. In some embodiments, the FC-BGP to FC gateway 417 in the FC switch 419 can be configured to connect the FC-BGP network 400 with the iSNS network 440 via SCN and/or RSCN messages. In such embodiments, the FC-BGP to FC gateway 417 can be configured to manage a name-server database for devices that use, for example, iSCSI in the iSNS network 440. Similarly, the FC-BGP to FC gateway 415 in the FC switch 414 can be configured to connect the FC-BGP network 400 with the typical FC network 450 via SCN and/or RSCN registrations and notifications. In such embodiments, the FC-BGP to FC gateway 415 can be configured to pull and/or push SCN and/or RSCN messages in the FC network 450.

Figure 5:
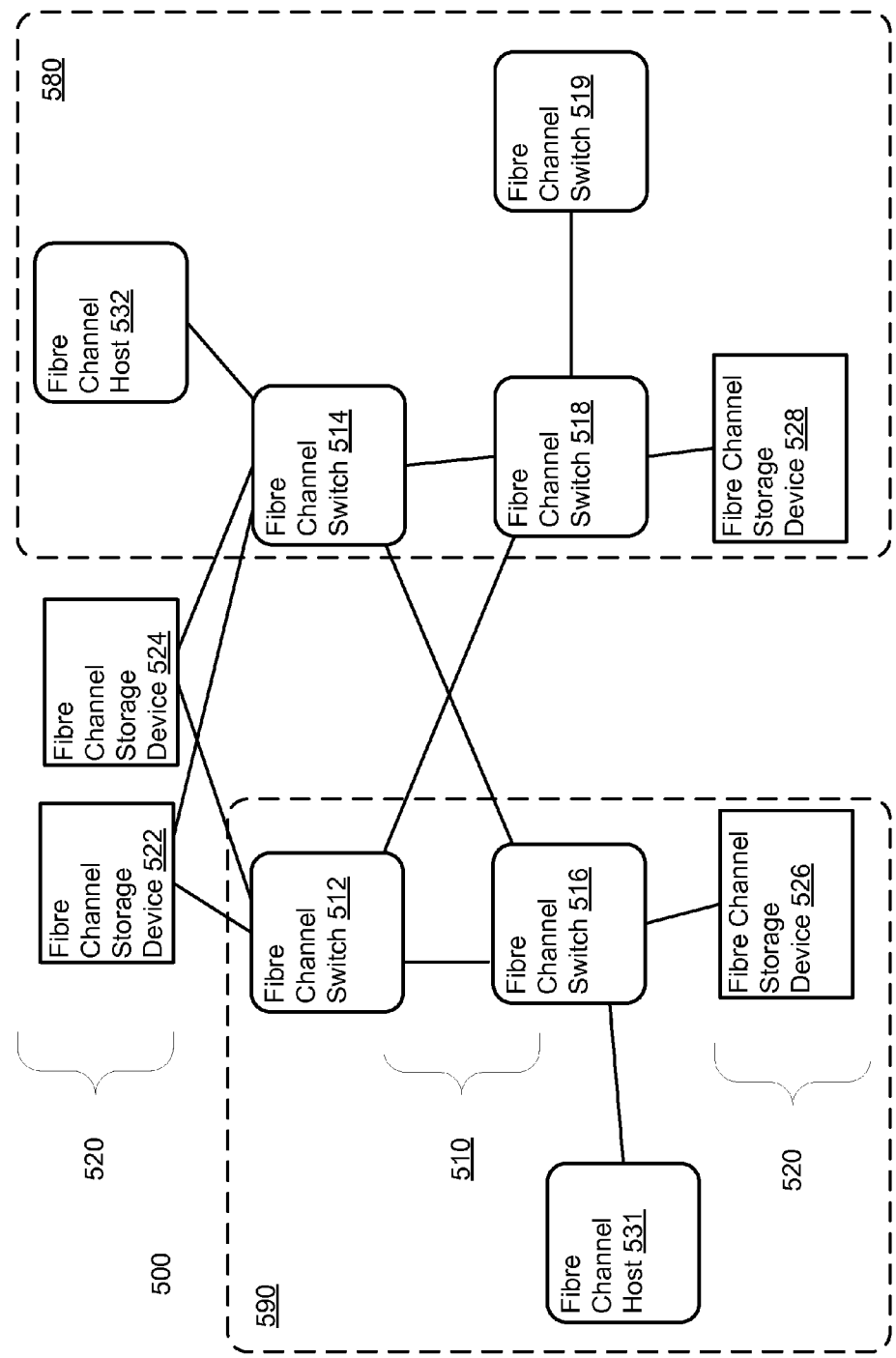
FIG. 5 is a system block diagram of an FC-BGP network including multiple virtual fabrics (VFs), according to an embodiment.

FIG. 5 is a system block diagram of an FC-BGP network 500 including multiple virtual fabrics (VFs) 580 and 590, according to an embodiment. The FC-BGP network 500 is structurally and functionally similar to the FC network 100 shown in FIG. 1. As shown in FIG. 5, the FC-BGP network 500 includes FC switches 512, 514, 516, 518 and 519 (collectively referred to as FC switches 510), FC storage devices 522, 524, 526 and 528 (collectively referred to as FC storage devices 520), and FC hosts 531 and 532. The FC switches 510 can be structurally and functionally similar to the FC switches 110 shown and described with respect to FIG. 1. Similarly, the FC storage devices 520 can be structurally and functionally similar to the FC storage devices 120 shown and described with respect to FIG. 1. The FC hosts 531 and 532 can be structurally and functionally similar to the FC hosts 130 shown and described with respect to FIG. 1.

As shown in FIG. 5, the FC switch 512 can be coupled to the FC storage devices 522 and 524, and to the FC switches 516 and 518. The FC switch 514 can be coupled to the FC storage devices 522 and 524, to the FC host 532, and to the FC switches 516 and 518. The FC switch 516 can be coupled to the FC storage device 526 and the FC host 531. The FC switch 518 can be coupled to the FC storage device 528 and the FC switch 519. Furthermore, the FC switches 512 and 516, the FC storage device 526, and the FC host 531 are included in the virtual fabric 590. The FC switches 514, 518 and 519, the FC storage device 528, and the FC host 532 are included in the virtual fabric 580.

In some embodiments, the route-target filtering function of the BGP can be used, in the FC-BGP protocol, to advertise FC routes to a set of FC switches 510 in the FC-BGP network 500. In some embodiments, a common route-target can be defined for all the FC switches 510 within a given virtual fabric. In such embodiments, the route-target can be derived using, for example, an identifier associated with that virtual fabric. In some embodiments, such an identifier can be a VF-ID associated with the virtual fabric. Each FC switch 510 included in that virtual fabric can join that route-target. Additionally, in some embodiments, the VF-ID associated with that virtual fabric can be included in, for example, an NLRI portion of a control packet (in the form of a BGP message) such that the BGP message can be distinguished from other BGP messages associated with other virtual fabric(s).

For example, the FC switches 512 and 516 can join a first common route-target that is defined for the FC switches 510 in the virtual fabric 590. The FC switches 514, 518 and 519 can join a second common route-target that is defined for the FC switches 510 in the virtual fabric 580. The two common route-targets can be derived using a VF-ID associated with the virtual fabric 590 and a VF-ID associated with the virtual fabric 580, respectively. As a result, the VF-ID associated with the virtual fabric 590 can be included in an NLRI portion of the BGP messages that are advertised across FC switches 510 in the virtual fabric 590. Similarly, the VF-ID associated with the virtual fabric 580 can be included in an NLRI portion of the BGP messages that are advertised across FC switches 510 in the virtual fabric 580.

Route-targets can also be defined for other types of FC switches. In some embodiments, a common route-target can be defined for all the FC switches within a given virtual fabric that are connected on the same virtual local area network (VLAN) using FCoE. In such embodiments, the common route-target can be derived using, for example, a VF-ID associated with the virtual fabric and a VLAN-ID associated with the VLAN. In some embodiments, a route-target can be defined for a given FC switch or FC-proxy switch based on its FC-ID, its FCoE-MAC (media access control) address, or its WWN-address. In such embodiments, the route target can be derived using the FC-ID, the FCoE-MAC address, or the WWW-address of the FC switch or FC-proxy switch.

In some embodiments, the FC-BGP protocol can be used to advertise principle switch election and allocate domain-IDs among the FC switches 510 in the FC-BGP network 500. As a result, the FC-BGP protocol can be used to replace, for example, the flooding techniques for principle switch election and domain-ID allocation that are used in a typical FC network. In some embodiments, an NLRI portion in an FC-BGP control packet (e.g., the NLRI portion 324 in the FC control packet 300 shown and described with respect to FIG. 3) can be defined to advertise principle switch election priority. In such embodiments, the NLRI portion can be generated by each FC switch 510 within a virtual fabric (e.g., the virtual fabric 580, 590) and then flooded to all other FC switches 510 within the virtual fabric using the BGP.

In some embodiments, to elect a principle switch for a virtual fabric, the FC switches 510 within that virtual fabric can be configured to gather or obtain all principle switch election priority NLRI from all other FC switches 510 within the same virtual fabric. Specifically, a BGP peering can be established between two FC switches 510 such that the two FC switches 510 can be configured to exchange their principle switch election NLRIs. In some embodiments, for example, the BGP graceful-restart mechanism can be used for the FC switches 510 to obtain a full set of updates associated with the principle switch election NLRIs from each other FC switch 510. After the updated principle switch election NLRIs are obtained by each FC switch 510 within the virtual fabric, the FC switches 510 can be configured to perform principle switch election using a suitable mechanism. As a result, a principle switch from the FC switches 510 can be determined for that virtual fabric.

In some embodiments, an NLRI portion in an FC-BGP control packet (e.g., the NLRI portion 324 in the FC control packet 300 shown and described with respect to FIG. 3) can be defined to hand out domain-IDs to each BGP peer that is an FC switch within the virtual fabric. The elected principle switch of the virtual fabric can be configured to send the NLRI when the principle switch detects a new FC BGP peer within that virtual fabric. In some embodiments, a new FC BGP peer can be detected through its principle switch election NLRI as described above. Additionally, in the event of FC network merging, the above-mentioned NLRI can also be used by the new principle switch of the combined FC network to hand out the same domain-ID to the BGP peers as far as possible.

As described above with respect to FIGS. 1, 4 and 5, the BGP with the various extensions can be used in, for example, a converged FC network to transmit IP/Ethernet data as well as FC data in the control plane of the FC network. Although not shown in the figures and not described herein, in some embodiments, other extensions of the BGP can also be implemented for an FC network. Such extensions of the BGP can include, for example, graceful-restart, use of BGP confederations for scaling, External BGP (EBGP) peering to modify next-hop, traffic-engineering described in Multiprotocol-BGP (MP-BGP), etc.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:
a first Fibre Channel (FC) switch configured to be operatively coupled to an FC network device and a second PC switch, the first PC switch configured to receive, from the FC network device, a first control packet,
the first FC switch configured to send to the second FC switch, based on the first control packet; a second control packet defined based on a decentralized control plane protocol, the second control packet including information associated with an FC route associated with the FC network device such that (1) the second FC switch does not route FC data packets to the FC network device using the FC route before the second FC switch receives the second control packet; and (2) the second FC switch routes FC data packets to the PC network device using the FC route after the second FC switch receives the second control packet;
the first FC switch further configured to send a third control packet, such that priority information for the first FC switch and included in a network layer reachability information (NLRI) portion of the third control packet is used in a principle switch election associated with a plurality of FC switches that includes the first FC switch.

2. The apparatus of claim 1, wherein the decentralized control plane protocol is a Boarder Gateway Protocol (BGP).

3. The apparatus of claim 1, wherein the decentralized control plane protocol is a Boarder Gateway Protocol (BGP), the information associated with the FC route is included in a NLRI portion of the second control packet.

4. The apparatus of claim 1, wherein the second control packet includes a virtual fabric identifier (VF-TD) associated with a virtual fabric that includes the FC network device.

5. The apparatus of claim 1, wherein the decentralized control plane protocol is a Boarder Gateway Protocol (BGP), the first control packet being defined based on an FC control plane protocol.

6. The apparatus of claim 1, wherein the first FC switch is configured to be operatively coupled to the second FC switch via a Boarder Gateway Protocol (BGP) route reflector such that the first FC switch is configured to send the second control packet to the second FC switch via the BGP route reflector.

7. The apparatus of claim 1, wherein the decentralized control plane protocol is a Boarder Gateway Protocol (BGP), the first FC switch is configured to send the third control packet defined based on the BGP, the priority information for the first FC switch being included in a NLRI portion of the third control packet.

8. An apparatus, comprising
a first Fibre Channel (FC) switch configured to be operatively coupled to a second FC switch within an FC network, the first FC switch configured to receive an update associated with an FC zone-set,
the first FC switch configured to send, based on receiving the update, a control packet including the update associated with the FC zone-set via an updated record from a zone-server database represented by a network layer reachability information (NLRI) portion of the control packet to the second FC switch such that the second FC switch is configured to update, without forwarding the update associated with the FC zone-set to another device, an FC zone-server database at the second FC switch with the update associated with the FC zone-set, the control packet being defined based on a Boarder Gateway Protocol (BGP).

9. The apparatus of claim 8, wherein the first FC switch is configured to receive, from the second FC switch, a BGP acknowledgement packet indicating that the second FC switch has updated the FC zone-server database.

10. The apparatus of claim 8, wherein the first FC switch is configured to send the control packet to the second FC switch such that the second FC switch is configured to apply the FC zone-set to an FC data plane of the FC network.

11. The apparatus of claim 8, wherein the first FC switch is configured to be operatively coupled to the second FC switch via a BGP route reflector such that the first FC switch is configured to send the control packet to the second FC switch via the BGP route reflector.

12. The apparatus of claim 8, wherein the control packet is a first control packet, the first FC switch is configured to send a second control packet including data associated with an updated FC name-server database to the second FC switch, the second control packet is defined based on the BGP.

13. An apparatus, comprising:
a first Fibre Channel (FC) switch configured to be operatively coupled to (1) a second FC switch configured to use a first control plane protocol, and (2) a third FC switch configured to use a second control plane protocol different than the first control plane protocol,
the first FC switch configured to receive, from the second FC switch, a first control packet having FC routing information, the first control packet being defined based on the first control plane protocol,
the first FC switch configured to define a second control packet based on the first control packet, the second control packet being defined based on the second control plane protocol and including the FC routing information, the second control packet including an update associated with a FC zone-set in a network layer reachability information (NLRI) portion of the second control packet, the NLRI portion of the second control packet representing an updated record from a zone-server database, the first FC switch configured to send the second control packet to the third FC switch such that the third FC switch implements the FC routing information and updates, using the second control packet and without forwarding the update associated with the FC zone-set to another device, an FC zone-server database with the update associated with the FC zone-set.

14. The apparatus of claim 13, wherein the first FC switch is configured to send the second control packet to the third FC switch such that the third FC switch is configured to send an FC data packet to the second FC switch using an FC data plane protocol.

15. The apparatus of claim 13, wherein the first control plane protocol is a Boarder Gateway Protocol (BGP) and the second control plane protocol is an FC control plane protocol.

16. The apparatus of claim 13, wherein the first control plane protocol is a Boarder Gateway Protocol (BGP) and the second control plane protocol is an Internet Storage Name Service (iSNS) protocol.

17. The apparatus of claim 13, wherein:
the first control plane protocol is a Boarder Gateway Protocol (BGP),
the FC routing information is within a NLRI portion of the first control packet, and
the second control plane protocol is an FC control plane protocol, the second control packet being a Fabric Shortest Path First (FSPF) packet.

18. The apparatus of claim 13, wherein the first control packet includes a virtual fabric identifier (VF-ID) associated with a virtual fabric that includes the second FC switch.

19. The apparatus of claim 13, wherein the first FC switch is configured to be operatively coupled to the second FC switch via a Boarder Gateway Protocol (BGP) route reflector such that the first FC switch is configured to receive the first control packet from the second FC switch via the BGP route reflector.

20. The apparatus of claim 13, wherein the NLRI portion of the second control packet includes a zone-set name, a zone-set activity status, a beginning-of-zone-set marker, an end-of-zone-set marker, a sequence number, and a zone-set generation identifier indicating a version of the zone-set.

* * * * *